(12) United States Patent
Barazani

(10) Patent No.: US 6,299,389 B1
(45) Date of Patent: Oct. 9, 2001

(54) CUTTING TOOL ASSEMBLY

(75) Inventor: Gideon Barazani, Kiriat Bialik (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 09/458,675

(22) Filed: Dec. 10, 1999

(30) Foreign Application Priority Data

Dec. 25, 1998 (IL) ........................................ 127738

(51) Int. Cl.[7] .............................. B23C 5/22; B23C 5/08; B23D 61/06; B23B 27/16
(52) U.S. Cl. ......................... 407/110; 407/101; 407/52; 407/50; 407/46; 407/117; 83/845; 144/173; 144/230
(58) Field of Search .................................. 407/117, 110, 407/108, 109, 101, 51, 52, 50, 47, 46; 83/845; 144/34, 230, 173

(56) References Cited

U.S. PATENT DOCUMENTS

| | | | | |
|---|---|---|---|---|
| 341,187 | * | 5/1886 | Timmons | 83/845 |
| 383,103 | * | 5/1888 | Cook | 83/845 |
| 1,090,205 | * | 3/1914 | Gorton | 407/50 |
| 1,269,378 | * | 6/1918 | Bunch | 144/230 |
| 1,549,036 | * | 8/1925 | Westguard | 144/230 |
| 4,363,576 | * | 12/1982 | Zweekly | 83/845 |
| 4,492,140 | * | 1/1985 | Pano | 407/46 |
| 4,580,930 | * | 4/1986 | Zinner | 407/110 |
| 4,604,004 | | 8/1986 | Armbrust . | |
| 4,744,703 | * | 5/1988 | Cochran | 407/117 |
| 5,112,164 | * | 5/1992 | Pano | 407/110 |
| 5,709,508 | * | 1/1998 | Barazani et al. | 407/101 |
| 5,829,923 | * | 11/1998 | Nowicki | 407/101 |
| 5,833,403 | * | 11/1998 | Barazani | 407/101 |

FOREIGN PATENT DOCUMENTS

| | | |
|---|---|---|
| 31 198 34 A1 | 12/1982 | (DE) . |
| 622584 | * 9/1978 | (RU) .................................. 407/117 |

* cited by examiner

*Primary Examiner*—William Briggs
*Assistant Examiner*—Erica Cadugan
(74) *Attorney, Agent, or Firm*—Pennie & Edmonds LLP

(57) ABSTRACT

A cutting tool assembly (10) having a body portion (12) and at least one cutting portion (14), the at least one cutting portion (14) having a clamping portion (16), an insert retaining member (18), a precisely located cutting insert (20) and a securing member (22) for ensuring that precise location of the cutting insert is maintained. If the insert-retaining member becomes damaged due to contact with a workpiece it can be removed from the cutting tool assembly and replaced.

23 Claims, 3 Drawing Sheets

CUTTING TOOL ASSEMBLY

FIELD OF THE INVENTION

This invention relates to a cutting tool assembly having a resilient clamping mechanism and a replaceable insert retention member.

BACKGROUND OF THE INVENTION

Cutting tools employing a resilient clamping mechanism for clamping cutting inserts are generally of relatively narrow thickness. For example, cutting operations such as grooving and parting off can be performed by a cutting insert retained in an insert pocket located between the clamping surfaces of upper and lower jaws of a relatively narrow holder blade. The holder blade is, in turn, generally clamped in a blade-retaining block. The holder blade is generally provided with a suitably designed opening, in the vicinity of the insert pocket whereby a relatively narrow bridging portion is formed enabling a limited degree of resilient displacement of one of the holder blade's jaws relative to the other. Generally, the lower jaw is rigid and the upper jaw is resiliently displaceable. The opening can be of the form of an aperture,or a slot, or a slot terminating in an aperture. Examples of such cutting tools are disclosed in U.S. Pat. No 3,785,021 and U.S. Pat. No 4,580,930. A rotary slot-cutting tool employing a resilient insert clamping mechanism is disclosed in U.S. Pat. No 5,059,068. The cutter body is disc-shaped and of relatively narrow thickness, with cutting insert pockets located around its periphery. As with the holder blade, an insert pocket of a rotary slot-cutting tool has two jaws between which an insert is clamped by means of the resilient force resulting from the bending of the clamping jaw.

Whether the cutting tool is a holder blade or a rotary slot cutting tool, the bending of the clamping jaw is obtained by manufacturing the insert pocket such that the distance between the clamping surfaces of the jaws is smaller than the height of the portion of the insert located between the clamping surfaces. Consequently, when an insert is located in the insert pocket, the clamping jaw is held in a bent position creating an elastic force by means of which the insert is clamped in position.

An example of a well-known problem with cutting tools of the type described above is that a forward region of the insert pocket can come into contact with the workpiece and consequently become damaged. This can be particularly problematic with rotary slot cutting tools, where the damaging of one or two insert pockets requires the replacing of the whole cutting tool. A solution to this problem is proposed in U.S. Pat. No. 4,604,004 in which there is disclosed a cutting tool assembly having a hard, wear resistant insert, a shim and a blade body. The shim has a recess that tapers towards its open end to springingly hold the insert. The blade body has a downwardly and rearwardly extending recess that tapers toward the blade body to wedgingly hold the shim and insert. Assembly of the cutting tool assembly is accomplished by first inserting the insert into the shim recess, after which the shim, with the insert mounted therein, is inserted into the blade body recess. As the cutting tool assembly is contacted with a workpiece, the insert and the shim are wedged further into the blade body recess, thereby increasing the positive retention of the insert and the shim. After a period of use, the insert and shim are removed from the body so that the insert can be replaced. The shim is removed from the blade body by inserting a screwdriver in a gap between the blade body and the shim and applying a prying action to the screwdriver. The insert is removed from the shim by inserting a screwdriver into a notch of the shim and then twisting the screwdriver.

A disadvantage of the cutting tool assembly disclosed in the '004 patent is that after assembling the cutting tool assembly, the cutting edge of the cutting insert is not precisely located. As pointed out in the '004 patent, the insert and the shim are further wedged into the blade body recess as the cutting tool assembly is contacted with a workpiece. This situation is particularly disadvantageous for rotary slot cutting tools where there are a plurality of cutting inserts spaced about the periphery of the tool and imprecise location of the cutting edges of the cutting inserts results in inefficient cutting operations in which some of the inserts participate more in the cutting operation than others.

In the '004 Patent the member in which the cutting insert is mounted is referred to as a "shim". In the following description and claims the member in which the cutting insert is mounted will be referred to as an "insert retention member".

It is an object of the present invention to provide a cutting tool assembly having a replaceable insert retention member with a resilient clamping mechanism that does not suffer from the above mentioned disadvantage.

A further disadvantage of the cutting tool assembly disclosed in the '004 patent is that in order to remove a retained cutting insert, the shim has to be removed from the blade body recess. It is a further object of the present invention to provide an embodiment of a cutting tool assembly having a replaceable insert retention member with a resilient clamping mechanism that does not require the removal of the insert retention member in order to remove a retained cutting insert.

A yet further disadvantage of the cutting tool assembly disclosed in the '004 patent is that, the shim is not secured to the blade body. This can be especially problematic if the shim is used in a rotary slot-cutting tool, since there is nothing to prevent the shim from becoming displaced during a slotting operation. It is yet a further object of the present invention to provide an embodiment of a cutting tool assembly having a replaceable insert retention member with a resilient clamping mechanism that is firmly secured to the body of the rotary slot cutting tool.

SUMMARY OF THE INVENTION

In accordance with the present invention there is provided a cutting tool assembly (10), comprising a body portion (12) and at least one cutting portion (14), the at least one cutting portion (14) comprising a clamping portion (16), an insert retaining member (18) and a cutting insert (20); the clamping portion (16) comprising:

a base jaw (26) having an upper side (28) constituting a first clamping surface;

a clamping jaw (30) having an upper side and a lower side (32), the lower side (32) constituting a second clamping surface, the base jaw (26) and the clamping jaw (30) having a gap (34) between them for receiving the insert retaining member (18); and a first location surface (44) for fixing the location of the insert retaining member (18); the insert retaining member (18) comprising:

a base jaw (48) having a lower side (54) constituting a first clamping abutment surface and a clamping jaw (50) having an upper side (56) constituting a second clamping abutment surface, the base jaw (48) and the clamping jaw (50) defining therebetween an insert pocket (52) for resiliently receiving the cutting insert (20); and a second location surface (60) capable of abutting the first location surface (44) for precisely locating the insert locating member (18) in the gap (34).

Preferably, the gap (34) is further provided with a slot (36) extending in a generally rearward direction from a rear section of the gap (34), the slot terminating in an aperture (38).

If desired, the first location surface (44) is located at a rear section of the gap (34) adjacent the slot (36) and oriented substantially perpendicular to the first (28) and second (32) clamping surfaces.

Further if desired, the second location surface (60) is located to the rear of the base jaw (48) of the insert retaining member (18).

In accordance with the present invention, the first location surface (44) abuts the second location surface (60) to precisely locate the insert retaining member (18) in the gap (34) between the clamping jaw (30) and the base jaw (26) of the clamping portion (16).

Further in accordance with the present invention, the insert retaining portion (18) further comprises a securing portion (58) to which a securing member (22) can be removably attached for securing the insert retaining member (18) in position in the gap (34) between the clamping jaw (30) and the base jaw (26) of the clamping portion (16).

In accordance with a preferred embodiment, the securing portion (58) is an elongated portion of the insert retaining member (18) extending in a generally rearward direction and capable of passing through the slot (36).

Further in accordance with a preferred embodiment, the upper side (28) of the base jaw (26) of the clamping portion (16) is substantially parallel to the lower side (32) of the clamping jaw (30) of the clamping portion (16).

Still further in accordance with a preferred embodiment, the first (54) and second (56) clamping abutment surfaces taper towards the rear of the insert retaining member (18) forming therebetween a taper angle.

In accordance with a specific application the taper angle is approximately 2°.

In accordance with the present invention the securing member (22) is located in the aperture (38) and is removably attached to the securing portion (58) of the insert retaining member (18).

In accordance with a preferred embodiment of the invention, the securing member (22) is of a general trapezoidal shape, having a forward face (64) and a rear face (66), and wherein when the insert retaining member (18) is retained in the gap (34) in the clamping portion (16), the securing member (22) is received in a recessed region (68) in the elongated portion (58) of the insert retaining member (18), the recessed region (68) having a shape generally similar to that of the securing member (22), the aperture (38) has two rearwardly facing spaced apart abutment surfaces (40, 42) adjacent the slot (36) and the elongated portion (58) of the insert retaining member (18) has a forwardly facing rear abutment surface (72), the securing member (22) being provided with a countersunk through bore (74) with a first longitudinal axis (76) and the recessed region (68) being provided with a screw threaded bore (78) having a second longitudinal axis (80), the first and second longitudinal axes (76, 80) being relatively displaced one with respect to the other in a manner so that when a countersunk head screw (24) is placed in the countersunk through bore (74) and is screwed into the screw threaded bore (78) the forward face (64) of the securing member (22) abuts the two rearwardly facing spaced apart abutment surfaces (40, 42) and the rear face (66) of the securing member (22) abuts the forwardly facing rear abutment surface (72) of the elongated portion (58), thereby ensuring that precise location of the insert retaining member (18) is maintained.

If desired, the insert pocket (52) is provided with an aperture (53) extending from a rear section of the insert pocket (52) in a generally rearward direction.

In accordance with one application, the cutting tool is a rotary slot cutting tool (96).

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
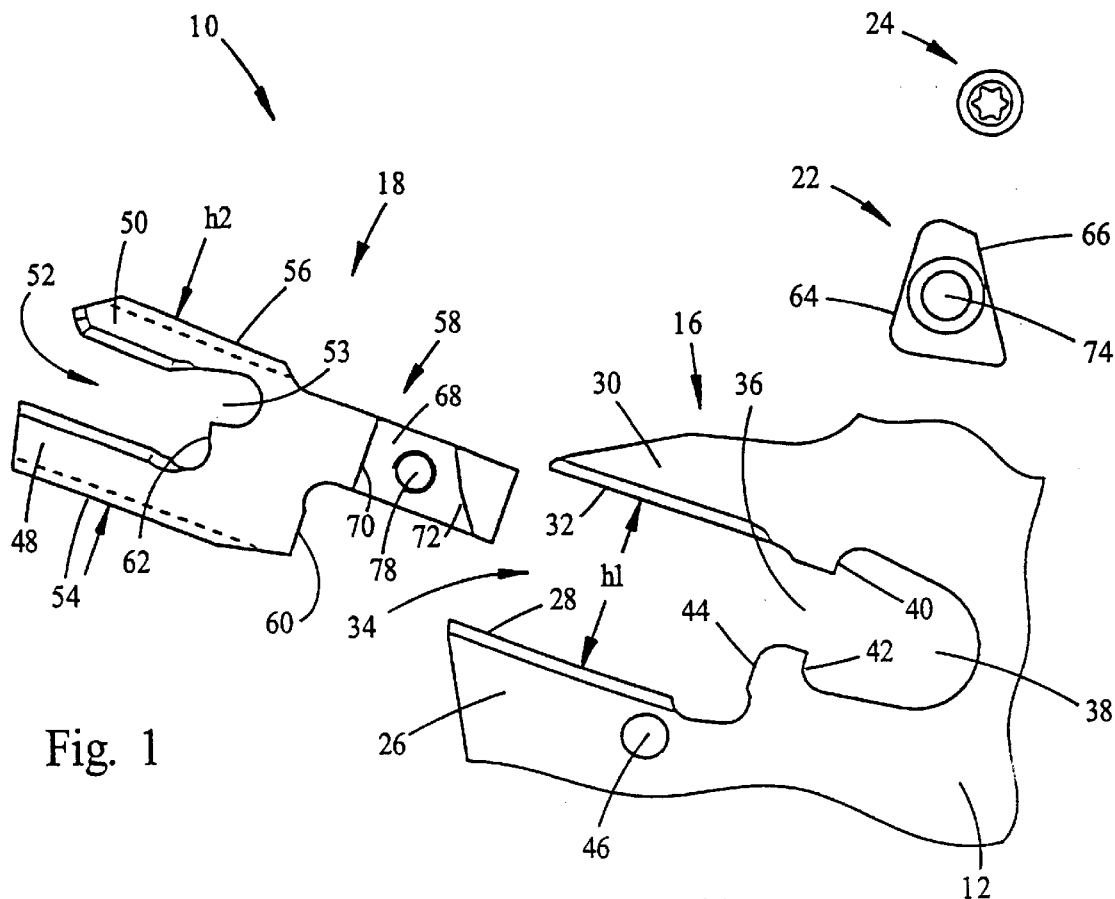
FIG. 1 is an exploded side view of a cutting portion of a cutting tool comprising a clamping portion, an insert retaining member, a cutting insert and a securing member.
Figure 2:
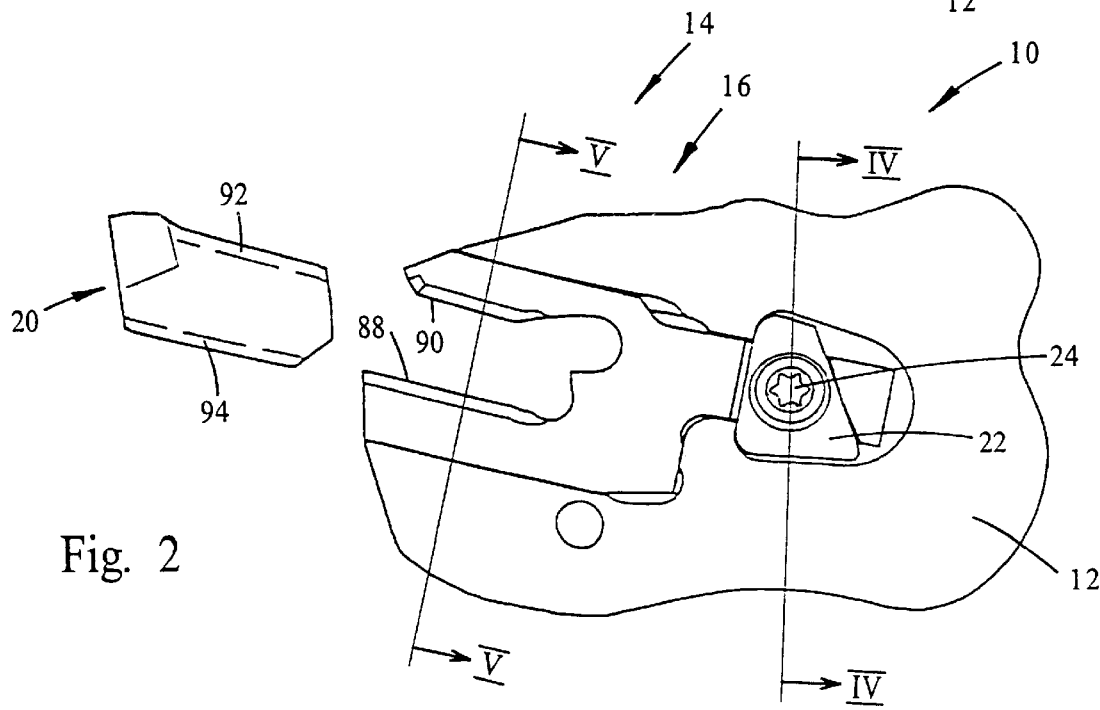
FIG. 2 is a side view of the cutting portion of FIG. 1, showing the retaining member mounted in the clamping portion thereof and secured in position by means of the securing member.
Figure 3:
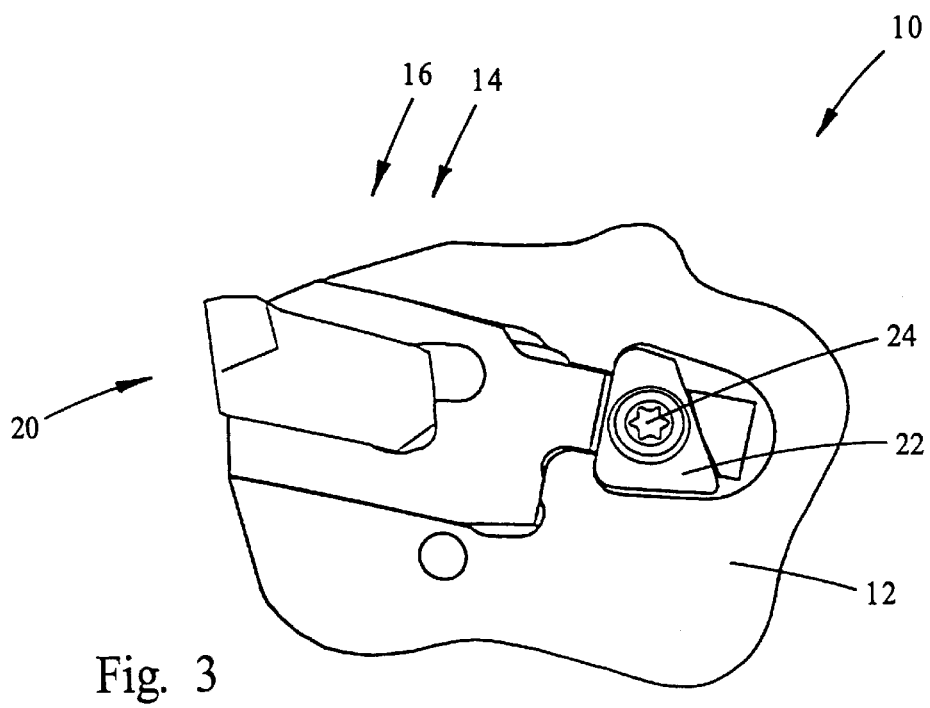
FIG. 3 is a side view of the cutting portion of FIG. 1, showing the insert retaining member mounted in the clamping portion thereof and secured in position by means of the securing member with the cutting insert mounted in the insert pocket.

Attention is first drawn to FIGS. 1 to 3. A cutting tool assembly 10, comprises a body portion 12 and a cutting portion 14. In the following description and claims the directional terms are in accordance with the orientation of the portion of the cutting tool assembly shown in FIGS. 1 to 3. Therefore, a portion of a member to the left in the figures will be referred to as a forward portion of the member, whereas a portion of a member to the right in the figures will be referred to as a rear portion of the member. Similarly, portions of a member to the top and bottom in the figures refer, respectively, to upper and lower portions of the member. The cutting portion 14 is a forward portion of the cutting tool assembly 10 comprising a clamping portion 16, an insert retaining member 18, a cutting insert 20 and a securing member 22. The securing member 22 is fastened to the insert-retaining member 18 by means of a countersunk head screw 24. As will be described in greater detail below, the securing member 22 is for securing the insert retaining member 18 in position thereby ensuring that the precise location of the insert retaining member and consequently of the cutting insert is maintained throughout a cutting operation.

The clamping portion 16 comprises a base jaw 26 having an upper side 28, constituting a first clamping surface and a clamping jaw 30 having lower side 32, constituting a second clamping surface. The base jaw 26 and the clamping jaw 30 having a gap 34 between them for resiliently receiving the insert retaining member 18, the first and second clamping surfaces constituting, respectively, lower and upper boundaries of the gap 34. The first and second clamping surfaces 28 and 32, respectively, are substantially parallel to each other and the distance between them is $h_1$. An imaginary line parallel to the first and second clamping surfaces 28 and 32, respectively, and passing approximately midway between them, defines a longitudinal axis of the cutting portion 14 of the cutting tool assembly 10.

A slot 36 extends in a generally rearward direction from a rear section of the gap 34. The slot 36 terminates in an aperture 38, having two rearwardly facing spaced apart abutment surfaces, an upper abutment surface 40 and a lower abutment surface 42, adjacent the slot 36. The abutment surfaces 40 and 42 lie along a common imaginary line that is substantially perpendicular to the longitudinal axis of the cutting portion 14. A forwardly facing first location surface 44 is located at a rear section of the gap 34 adjacent the slot 36 and is oriented substantially perpendicular to the longitudinal axis of the cutting portion 14. The base jaw is provided with a throughgoing aperture 46 for receiving a prong of a key for the removal of an insert retained by the insert retaining member 18. The insert retaining member 18 comprises a base jaw 48 and a clamping jaw 50 defining therebetween an insert pocket 52 for receiving the cutting insert 20. The insert-receiving pocket 52 is provided with an aperture 53 for receiving an insert-removing device that can be used in conjunction with the throughgoing aperture 46. The aperture 53 extends from a rear section of the insert-receiving pocket in a generally rearward direction.

The base jaw 48 has a lower side 54 constituting a first clamping abutment surface and the clamping jaw 50 has an upper side 56 constituting a second clamping abutment surface. The first and second clamping abutment surfaces 54 and 56, respectively, taper towards the rear of the insert-retaining member 18 forming between them a taper angle. The taper angle is, preferably, approximately 2°. The distance, $h_2$, between the first and second clamping abutment surfaces 54 and 56, respectively, taken approximately at the mid point of the second clamping abutment surface 56, is approximately equal to $h_1$. Therefore, due to the tapering of the clamping abutment surfaces, when the insert-retaining member 18 is mounted in the gap 34 and urged towards the rear of the gap, it will, at first, slide in without resistance until it is approximately halfway into the gap. In order to complete the mounting of the insert-retaining member, so that it is fully retained in the gap, force has to be applied to the insert-retaining member.

The insert-retaining member 18 has an elongated portion 58 extending in a generally rearward direction. The elongated portion constituting a securing member. The dimensions of the elongated portion are such that it is capable of passing through the slot 36 when mounting the insert-retaining member 18 in the gap 34. The insert-retaining member 18 is provided with a rearwardly facing second location surface 60 located to the rear of the lower jaw 48. When the insert-retaining member 18 is fully retained in the gap 34, the first location surface 44 abuts the second location surface 60 to ensure precise location of the insert-retaining member 18. The insert-retaining member is provided with an insert-locating surface 62 for precise location of the cutting insert with respect to the insert-retaining member. Consequently, with both the insert retaining member precisely located with respect to the body portion and the insert precisely located with respect to the retaining member, the cutting edge of the cutting insert is precisely located with respect to the body portion.

Figure 4:
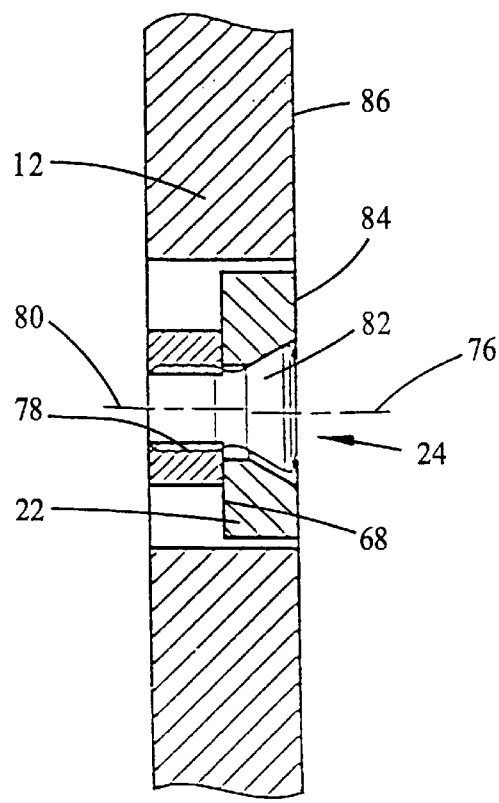
FIG. 4 is a partial cross sectional view of the cutting portion of FIG. 2 taken along the line IV—IV.

In addition to FIGS. 1 to 3, attention is now also drawn to FIG. 4. The securing member 22 is of a general trapezoidal shape, having a forward face 64 and a rear face 66, and is received in a recessed region 68 in the elongated portion 58 of the insert retaining member 18. The recessed region 68 has a forward face 70 and a rear face 72, and has a shape generally similar to that of the securing member 22. The rear face 72 constitutes a forwardly facing abutment surface. The securing member is provided with a countersunk through bore 74 having a first longitudinal axis 76, and the recessed region 68 is provided with a screw threaded bore 78 having a second longitudinal axis 80.

When the retaining member is fully retained in the gap 34 and the securing member 22 is positioned in the recessed region 68, the first and second longitudinal axes are relatively displaced with respect to each other, in a manner such that when the countersunk head screw 24 is placed in the countersunk through bore 74 and is screwed into the screw threaded bore 78, the forward face 64, of the securing member 22, abuts the two rearwardly facing spaced apart abutment surfaces 40 and 42, and the rear face 66, of the securing member, abuts the rear face 72 of the recessed region 68 in the insert retaining member. This creates a three-point contact arrangement between the securing member 22, the insert retaining member 18 and the body portion 12. As the countersunk head screw 24 is tightened its conical head 82 abuts an upper portion of the matching countersunk through bore 74 of the securing member 22, and the securing member is forced to move in an upward direction as the first longitudinal axis 76 moves towards the second longitudinal axis 80. Due to the three-point contact arrangement and the trapezoidal shape of the securing member, the more the countersunk head screw 24 is tightened, the greater the securing force applied by the securing member on the insert retaining member via the rear face 66 of the securing member as it abuts the rear face 72 of the recessed region 68. As seen in FIG. 4, the thickness of the securing member 22 is such that its outwardly facing surface 84 is substantially flush with a side surface 86 of the body portion 12.

Figure 5:
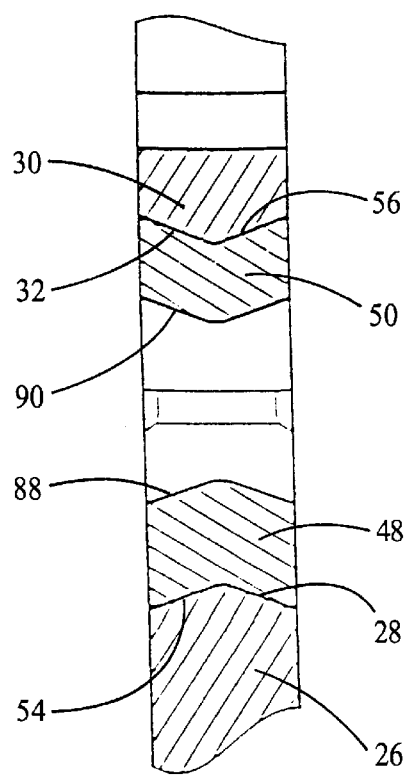
FIG. 5 is a partial cross sectional view of the cutting portion of FIG. 2 taken along the line V—V.

Attention is now drawn to FIG. 5, showing the mechanism for preventing lateral movement of the insert retaining member 18 with respect to the clamping portion 16 of the body portion 12. In accordance with a preferred embodiment of the present invention, the first and second clamping surfaces 28 and 32, respectively, of the base jaw 26 and clamping jaw 30, respectively, have convex V-shaped cross-sections, and the first and second clamping abutment surfaces 54 and 56, respectively, of the base jaw 48 and clamping jaw 50, respectively, of the insert retaining member 18, have mating concave V-shaped cross-sectional surfaces. As is well known in the art (see, for example, U.S. Pat. No. 4,580,930 and U.S. Pat. No. 4,887,945) lateral stability of a cutting insert can be achieved in a similar way. The clamping surfaces 88 and 90 of the base jaw 48 and clamping jaw 50, respectively, have convex V-shaped cross-sections, and the lower and upper abutment surfaces 94 and 92, respectively, of the cutting insert 20 have mating concave V-shaped cross-sectional surfaces (shown by broken lines in FIG. 2).

Figure 6:
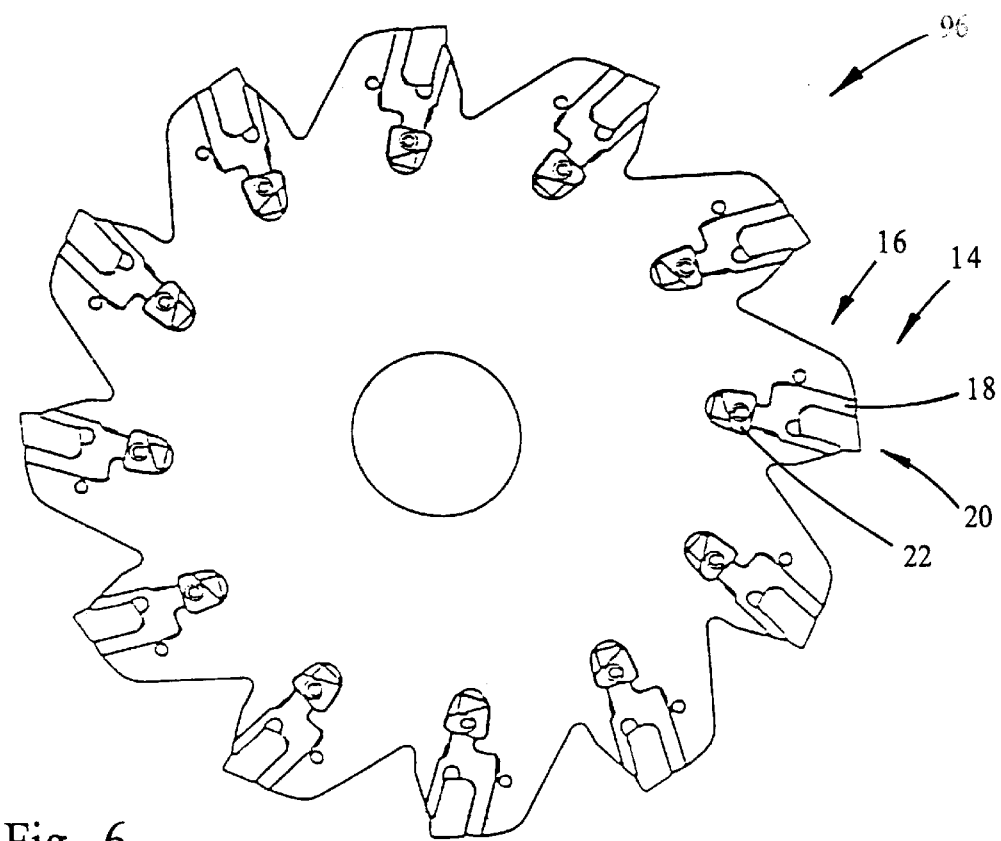
FIG. 6 is a side view of a rotary slot cutting tool having a cutting portion in accordance with the present invention.

FIG. 6 shows a rotary slot-cutting tool 96 with a plurality of cutting portions 14, arranged around the periphery of the tool, each cutting portion comprising a clamping portion 16, an insert retaining member 18, a cutting insert 20 and a securing member 22 in accordance with the present invention.

The preferred embodiment of the cutting tool assembly described herein has attributed to it three main properties: (i) it provides precise location of the cutting insert; (ii) it enables the insertion and removal of the cutting insert without necessitating the removal of the insert retaining member; and (iii) it provides means for firmly securing the insert retaining member to the cutting tool body. Although the present invention has been described to a certain degree of particularity, it should be understood that various alterations and modifications can be made without departing from the spirit or scope of the invention as hereinafter claimed. Therefore, a cutting tool assembly having only the first property is also within the scope of the present invention. Similarly, cutting tool assemblies having property (i) together with either of properties (ii) or (iii) are also within the scope of the present invention.

What is claimed is:

1. A cutting tool assembly (10) comprising a body portion (12) and at least one cutting portion (14), the at least one cutting portion (14) comprising a clamping portion (16), an insert retaining member (18) and a cutting insert (20);

the clamping portion (16) comprising:
      a first base jaw (26) having an upper side (28) constituting a first clamping surface;
      a first clamping jaw (30) having an upper side and a lower side (32), the lower side (32) constituting a second clamping surface, the first base jaw (26) and the first clamping jaw (30) having a gap (34) between them for receiving the insert retaining member (118), the gap having a front end through which the insert retaining member is inserted, and a rear end; and
      a first location surface (44) for fixing the location of the insert retaining member (18);
   the insert retaining member (18) comprising:
      a second base jaw (48) having a lower side (54) constituting a first clamping abutment surface and a second clamping jaw (50) having an upper side (56) constituting a second clamping abutment surface, the second base jaw (48) and the second clamping jaw (50) defining therebetween an insert pocket (52) for receiving the cutting insert (20) therein;
      a second location surface (60) capable of abutting the first location surface (44) for precisely locating the insert retaining member (18) in the gap (34), wherein:
         the gap (34) is further provided with a slot (36) extending in a generally rearward direction from the rear end of the gap (34), the slot terminating in an aperture (38);
         the first location surface (44) is located at the rear end of the gap (34) adjacent the slot (36) and oriented substantially perpendicularly to the first (28) and second (32) clamping surfaces;
         the second location surface (60) is located on the second base jaw (48);
         the first location surface (44) abuts the second location surface (60) to precisely locate the insert retaining member (18) in the gap (34);
         the insert retaining member (18) further comprises a securing portion (58) to which a securing member (22) can be removably attached for securing the insert retaining member (18) within the gap (34), the securing portion (58) being an elongated portion of the insert retaining member (18) extending in a direction away from the insert pocket (52) and capable of passing through the slot (36); and
         wherein the securing member (22) is of a generally trapezoidal shape, having a forward face (64) and a rear face (66), and wherein the insert retaining member (22) is received in a recessed region (68) in the elongated portion (58) of the insert retaining member (18), the recessed region (68) having a shape generally similar to that of the securing member (22), the aperture (38) has two rearwardly facing spaced apart abutment surfaces (40, 42) adjacent the slot (36) and the elongated portion (58) of the insert retaining member (18) has a forwardly facing rear abutment surface (72), the securing member (22) being provided with a countersunk through bore (74) with a first longitudinal axis (76) and the recessed region (68) being provided with a screw threaded bore (78) having a second longitudinal axis (80), the first and second longitudinal axes (76, 80) being relatively displaced one with respect to the other in a manner so that when a countersunk head screw (24) is placed in the countersunk through bore (74) and is screwed into the screw threaded bore (78) the forward face (64) of the securing member (22) abuts the two rearwardly facing spaced apart abutment surfaces (40, 42) and the rear face (66) of the securing member (22) abuts the forwardly facing rear abutment surface (72) of the elongated portion (58), thereby ensuring that precise location of the insert retaining member (18) is maintained.

2. The cutting assembly according to claim 1, comprising a plurality of cutting portions (14) arranged around a periphery of a rotary slot cutting tool.

3. A cutting tool assembly (10), comprising a body portion (12) and at least one cutting portion (14), the at least one cutting portion (14) comprising a clamping portion (16), an insert retaining member (18), and a securing member (22);

the clamping portion (16) comprising:
      a first base jaw (26) having an upper side (28) constituting a first clamping surface;
      a first clamping jaw (30) having an upper side and a lower side (32), the lower side (32) constituting a second clamping surface, the upper side (28) of the first base jaw (26) being substantially parallel to the lower side (32) of the first clamping jaw (30), the first base jaw (26) and the first clamping jaw (30) having a gap (34) between them for receiving the insert retaining member (18) therein, the gap having a front end and a rear end, the gap defining a front-to-rear direction;
      a slot (36) extending rearwardly away from the rear end of the gap (34) in the front-to-rear direction, the slot terminating in an aperture (38);
      a first location surface (44), located at the rear end of the gap, for fixing the location of the insert retaining member (18);
   the insert retaining member (18) comprising:
      a second base jaw (48) having a front end and a rear end, and a lower side (54) constituting a first clamping abutment surface and a second clamping jaw (50) having an upper side (56) constituting a second clamping abutment surface, the second base jaw (48) and the second clamping jaw (50) defining therebetween an insert pocket (52); and
      a second location surface (60) configured to abut the first location surface (44) for precisely locating the insert retaining member (18) in the gap (34); and
      a securing portion (58) comprising an elongated portion of the insert retaining member (18)

extending from adjacent the rear end of the second base jaw (48) in the front-to-rear direction away from the front end of the second base jaw, the securing portion being shaped and sized to pass through the slot (36) and be received in the aperture, wherein the securing member (22) is removably attachable to the elongated portion of the insert retaining member for securing the insert retaining member (18) in the gap (34) between the first clamping jaw (30) and the first base jaw (26) of the clamping portion (16), with the securing member (22) being located in the aperture (38).

4. The cutting tool assembly according to claim 3, wherein the first location surface (44) is located at the rear end of the gap (34) adjacent the slot (36) and oriented substantially perpendicularly to the first (28) and second (32) clamping surfaces.

5. The cutting tool assembly according to claim 4, wherein the second location surface (60) is located at the rear end of the second base jaw (48).

6. The cutting tool assembly according to claim 5, wherein the first location surface (44) abuts the second location surface (60) to precisely locate the insert retaining member (18) in the gap (34) between the first clamping jaw (30) and the first base jaw (26).

7. The cutting tool assembly according to claim 3, wherein the first (54) and second (56) clamping abutment surfaces taper in the front-to-rear direction, forming therebetween a taper angle.

8. The cutting tool assembly according to claim 7, wherein the taper angle is approximately 2°.

9. The cutting tool assembly according to claim 3, wherein the securing member (22) is of a generally trapezoidal shape, having a forward face (64) and a rear face (66), and wherein when the insert retaining member (18) is retained in the gap (34) in the clamping portion (16), the securing member (22) is received in a recessed region (68) in the elongated securing portion (58) of the insert retaining member (18), the recessed region (68) having a shape generally similar to that of the securing member (22), the aperture (38) has two rearwardly facing spaced apart abutment surfaces (40, 42) adjacent the slot (36) and the elongated securing portion (58) of the insert retaining member (18) has a forwardly facing rear abutment surface (72), the securing member (22) being provided with a countersunk through bore (74) with a first longitudinal axis (76) and the recessed region (68) being provided with a screw threaded bore (78) having a second longitudinal axis (80), the first and second longitudinal axes (76, 80) being relatively displaced one with respect to the other in a manner so that when a countersunk head screw (24) is placed in the countersunk through bore (74) and is screwed into the screw threaded bore (78) the forward face (64) of the securing member (22) abuts the two rearwardly facing spaced apart abutment surfaces (40, 42) and the rear face (66) of the securing member (22) abuts the forwardly facing rear abutment surface (72) of the elongated securing portion (58), thereby ensuring that precise location of the insert retaining member (18) is maintained.

10. The cutting tool assembly according to claim 3, wherein the insert pocket (52) is provided with an aperture (53) extending from the insert pocket (52) generally in the front-to-rear direction.

11. The cutting tool assembly according to claim 3, comprising a plurality of cutting portions (14) arranged around a periphery of a rotary slot cutting tool.

12. The cutting tool assembly according to claim 3, further comprising a cutting insert (20) retained in the insert pocket (52).

13. A cutting tool assembly having a cutting portion comprising a clamping portion, an insert retaining member, and a securing member, wherein:

the clamping portion comprises a first clamping jaw and a first base jaw defining a gap therebetween, the gap having a front end shaped and sized to receive the insert retaining member, the gap also having a rear end terminating in a slot which extends in a direction away from the front end and leads to an aperture;

the insert retaining member comprises a second clamping jaw and a second base jaw defining therebetween an insert pocket, the second base jaw having a front end proximate to an opening of the insert pocket, and a rear end, the insert retaining member further comprising an elongated securing portion extending from adjacent the rear end of the second base jaw in a direction away from the front end of the second base jaw, the elongated securing portion being shaped and sized to pass through the slot and be received in the aperture, and wherein the assembly is adjustable between:
a disassembled position in which the insert retaining member and the securing member are separated from the clamping portion, and
an assembled position in which the insert retaining member is positioned in the gap with the elongated securing portion extending at least partially into the aperture, and the securing member at least partially occupies the aperture and is attached to the elongated securing portion of the insert retaining member to thereby secure the insert retaining member in the gap.

14. The cutting tool assembly according to claim 13, further comprising:
a first location surface formed on the clamping portion at the rear end of the gap, and
a second location surface formed adjacent the rear end of the second base jaw, and wherein
the first and second location surfaces abut one another, when the assembly is in the assembled position.

15. The cutting tool assembly according to claim 13, wherein the second clamping jaw has an upper side constituting a first clamping abutment surface, and the second base jaw has a lower side constituting a second clamping abutment surface, the first and second clamping abutment surfaces being substantially parallel to one another.

16. The cutting tool assembly according to claim 13, wherein the second clamping jaw has an upper side constituting a first clamping abutment surface, and the second base jaw has a lower side constituting a second clamping abutment surface, the first and second clamping abutment surfaces tapering in a direction towards the elongated securing portion and forming therebetween a taper angle.

17. The cutting tool assembly according to claim 16, wherein the taper angle is approximately 2°.

18. The cutting tool assembly according to claim 13, wherein the insert pocket is provided with an aperture for receiving an insert-removing device.

19. The cutting tool assembly according to claim 13, wherein the securing member comprises first and second faces, and the elongated securing portion comprises a recessed region provided with at least one abutment surface, at least one of the first and second faces abutting the at least one abutment surface of the recessed region, when the assembly is in the assembled position.

20. The cutting tool assembly according to claim 19, further comprising a head screw affixing the securing member to the elongated securing portion of the insert retaining member, when the assembly is in the assembled position.

21. The cutting tool assembly according to claim 19, wherein the securing member comprises first and second faces, and one of the first and second faces abutting at least one abutment surface of the aperture, to thereby prevent removal of the insert retaining member, when the assembly is in the assembled position.

22. The cutting tool assembly according to claim 13, comprising a plurality of cutting portions arranged around a periphery of a rotary slot cutting tool.

23. The cutting tool assembly according to claim 13, further comprising a cutting insert retained within the insert pocket, when the assembly is in the assembled position.

* * * * *